United States Patent [19]

Ikematsu et al.

[11] Patent Number: 4,658,978
[45] Date of Patent: Apr. 21, 1987

[54] TOP ENTRY BALL VALVE AND A CLAMP THEREFOR

[75] Inventors: Morio Ikematsu, Takaishi; Tohru Wada, Sakai; Tohru Nakanishi, Osaka; Nobuo Ishigami, Sakai, all of Japan

[73] Assignee: Nippon Ball Valve Co., Ltd., Osaka, Japan

[21] Appl. No.: 747,959

[22] Filed: Jun. 24, 1985

[51] Int. Cl.⁴ ............................................. F16K 5/06
[52] U.S. Cl. ................................ 251/315; 251/159; 251/174; 251/316; 137/316
[58] Field of Search ............... 251/159, 174, 314, 315, 251/316, 360; 137/316; 24/514

[56] References Cited

U.S. PATENT DOCUMENTS

| | | | |
|---|---|---|---|
| 1,453,863 | 5/1923 | Conard | 24/514 X |
| 2,664,267 | 12/1953 | Ray | 251/174 |
| 2,883,146 | 4/1959 | Knox | 251/174 X |
| 3,134,396 | 5/1964 | Bredtscheider | 251/174 X |
| 3,281,112 | 10/1966 | Walker | 251/315 X |
| 3,497,177 | 2/1970 | Hulsey | 251/174 X |
| 3,736,629 | 6/1973 | Blake | 24/514 |
| 3,771,545 | 11/1973 | Allen | 251/316 X |
| 4,151,855 | 5/1979 | Levin et al. | 251/315 X |
| 4,390,039 | 6/1983 | Johnson et al. | 251/316 X |

Primary Examiner—A. Michael Chambers
Assistant Examiner—John C. Fox
Attorney, Agent, or Firm—Wenderoth, Lind & Ponack

[57] ABSTRACT

A top entry ball valve is proposed which has a valve body formed with a valve chamber, a valve mounted in the valve chamber, a seat ring at the low-pressure side, and a seat ring assembly having another seat ring, a belleville spring and a seat ring holder at the high-pressure side. The seat ring assembly can be easily mounted into and removed out of the valve chamber by use of a clamp while comprising the belleville spring. The clamp comprises a pair of clamping pieces fastened together with a bolt.

5 Claims, 6 Drawing Figures

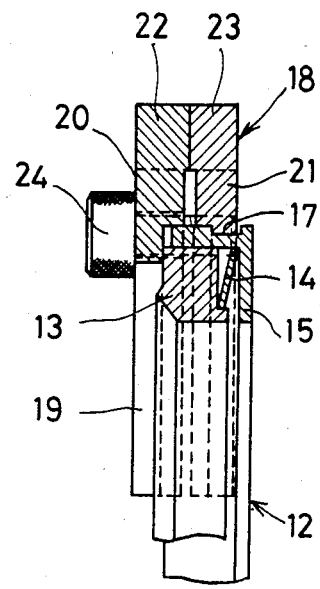
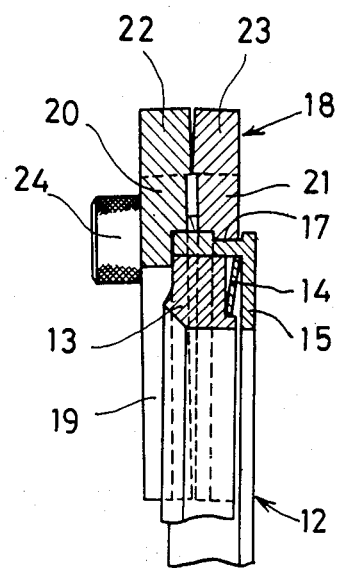
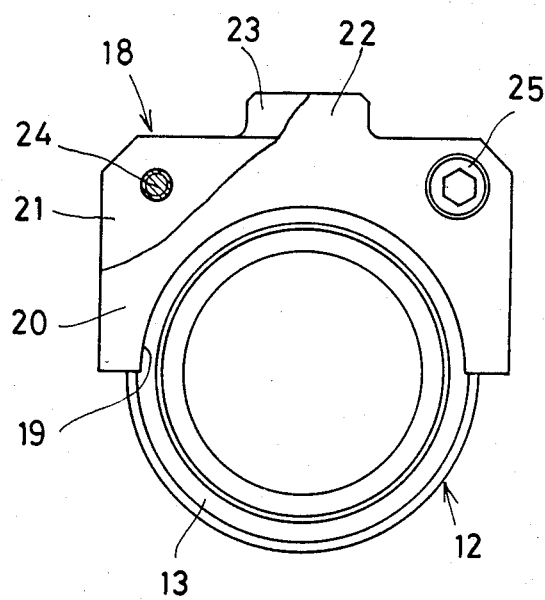

TOP ENTRY BALL VALVE AND A CLAMP THEREFOR

BACKGROUND OF THE INVENTION

The present invention relates to a top entry ball valve and a clamp therefor.

In conventional top entry ball valves, it is most common that the surfaces for receiving the valve seats on the brims of the valve ports at the high- and low-pressure sides of a valve chamber are tapered so as to allow a ball valve to fit snugly on the valve seat rings. These conventional top entry ball valves have a disadvantage that the optimum depth by which the ball valve is allowed to fit between the seat rings is limited within a narrow range. A ball valve fitting deeply requires too much torque. On the other hand, a ball valve fitting shallowly provides only imperfect sealing. It is difficult, therefore, to keep the operation efficiency and sealing performance in an ideal condition. It is also difficult to machine the tapered surfaces so as to provide satisfactory surface accuracy.

In another type of conventional top entry ball valve, in which the opposite surfaces for receiving the valve seats are parallel to each other, a valve seat ring assembly, which is a combination of a valve seat ring, a belleville spring and a valve seat ring holder, is provided at the high-pressure side so as to allow the ball valve to fit closely on the valve seat ring. The valve seat ring holder is screwed into the valve port at the high-pressure side so that an operator can turn the valve seat ring holder so as to move it toward and away from the ball valve. This type of conventional top entry ball valve has disadvantages in that it is intricate in construction since the valve body must be tapped and in that fine particles to be conveyed through the valve port are apt to stick to the tapped surface and thereby cause difficulties in the disassembly.

BRIEF SUMMARY OF THE INVENTION

It is an object of the present invention to provide a top entry ball valve in which the valve seat ring assembly can be easily mounted and removed into and out of the space between the ball valve and the surface for receiving the valve seat at the high-pressure side without the necessity of machining the valve body.

It is another object of the present invention to provide a clamp for mounting and removing the seal ring assembly into and out of the valve body.

BRIEF DESCRIPTION OF THE DRAWINGS

With the above-described objects in view and as will become apparent from the following detailed description, the present invention will be more cleary understood in connection with the accompanying drawings, in which:

FIGS. 4 and 5 are partially cutaway vertical sectional views illustrating how the first embodiment of the clamp is used;

FIG. 6 is a partially cutaway side view thereof;

DETAILED DESCRIPTION

Figure 1:
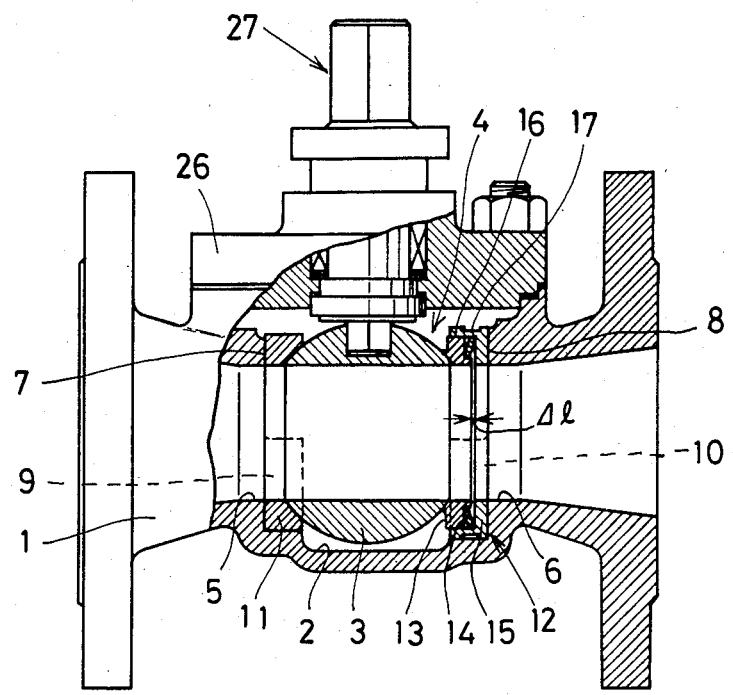
FIG. 1 is a vertical sectional view of a ball valve according to the present invention.
Figure 2:
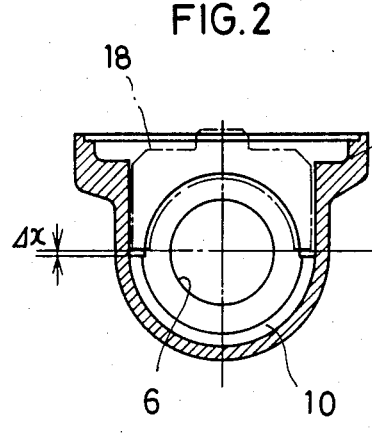
FIG. 2 is a cross-sectional side view of the valve body.
Figure 3:
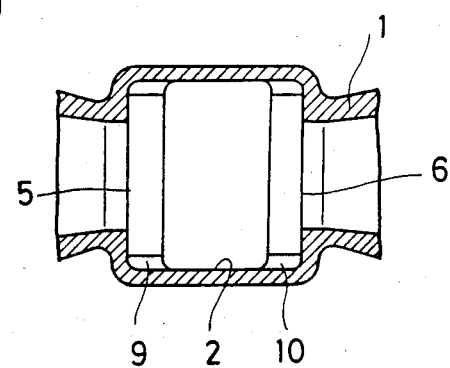
FIG. 3 is a partially broken away horizontal sectional view thereof.

Referring now to FIG. 1, a ball valve in accordance with the present invention includes a valve body 1 having a valve chamber 2 therein. The valve chamber 2 has an open top 4 through which a ball valve 3 can be put into and taken out of the valve chamber 2. Valve seal means for sealing the ball valve 3 in the valve body 1 and allowing the ball valve 3 to be removed through the open top 4 as a unit with the valve seal means comprise a valve seat ring 11 and a valve seat ring assembly 12. A surface 7 for receiving the valve seat ring 11 on the brim of a valve port 5 at the low-pressure side of the valve chamber 2 is parallel to a surface 8 for receiving the valve seat ring assembly 12 on the brim of a valve port 6 at the high-pressure side of the valve chamber 2. Stepped portions 9 and 10 in the form of semicircular arcs are formed substantially on and extend perpendicularly from the lower halves of the surfaces 7 and 8, respectively, to keep in position the valve seat ring 11 and the valve seat ring assembly 12 by supporting the radially outer surfaces of the valve seat ring 11 and the valve seat ring assembly 12, respectively. As shown in FIG. 2, the upper end faces of the stepped portions 9 and 10 are disposed below, and at a distance of $\Delta x$ from, a horizontal plane which contains the axis of the ball valve 3 and the valve ports 5 and 6.

The valve seat ring 11 supported by the stepped portion 9 is interposed between the surface 7 and the ball valve 3. The valve seat ring assembly 12 supported by the stepped portion 10 is interposed between the surface 8 and the ball valve 3. The valve seat ring assembly 12 is a combination of a valve seat ring 13, a belleville spring 14 and a valve seat ring holder 15, the last of which is an annular member having the same inside diameter as that of the valve port 6 and having an annular flange 16 projecting inwardly from its inner rim so as to accommodate the valve seat ring 13 and the belleville spring 14 therein. When the ball valve 3, valve seat ring 11 and valve seat ring assembly 12 are accommodated in the valve chamber 2 as shown in FIG. 1, the belleville spring 14 normally urges the valve seat ring 13 inwardly for disengagement from the valve seat ring holder 15 so as to leave a space of $\Delta l$ therebetween. An annular groove 17 is provided in the outside surface of the annular flange 16.

When the belleville spring 14 is in an uncompressed condition, the valve seat ring assembly 12 is too thick to be put into the valve chamber 2. On the other hand, when the ball valve 3, valve seat ring 11 and valve seat ring assembly 12 are already in the valve chamber 2, it is difficult to take them out of the valve chamber 2 because of large frictional force caused by the resilience of the belleville spring 14.

For the insertion and removal of the seat ring assembly 12, a clamp 18 shown in FIGS. 4–6 is convenient. It comprises two clamping pieces 20, 21 formed with a semicircular opening 19 (FIG. 6). One clamping piece 21 is adapted to engage on the seat ring holder 15 in its groove 17 whereas the other clamping piece 20 is adapted to engage on the seat ring 13. The clamping pieces 20, 21 are formed with projections 22, 23, respectively. These two projections protrude inwardly and butt against each other. They are clamped together by two bolts 24, 25 below a point where they are butted to each other.

After the clamping pieces 20, 21 have been engaged on the seat ring assembly 12 as shown in FIG. 4, they are clamped together with the bolts 24, 25. Now, the lower parts of the clamping pieces come toward each other, compressing the belleville spring 14. The seat ring assembly 12 now has a decreased thickness. Thus, the seat ring 11 and the seat ring assembly 12 can be inserted and removed into and from the valve chamber 2.

FIG. 1 shows the ball valve with the seat ring assembly 12 inserted in the valve chamber 2. In this state, the outer periphery of the seat ring assembly 12 and the upper half of the seat ring 13 are exposed in the valve chamber, so that the clamp 18 can be engaged on them.

As shown in FIG. 6, the clamp 18 has both sides protruding sidewise from the seat ring assembly 12 to be received in the space above the stepped portions 9, 10 formed in the valve chamber 2. (FIG. 2) In FIG. 1, numeral 26 designates a bonnet and an operating portion 27, which are conventional. In the embodiment, the stepped portions 9, 10 are not essential and may be omitted.

What we claim:

1. A top entry ball valve comprising:
   a valve body having a valve chamber therein and a top opening connected to said valve chamber;
   a valve removably mounted in said valve chamber, said valve sized to fit through said top opening;
   a low pressure side seat receiving surface and a high pressure side seat receiving surface being parallel to each other and formed in said valve body on opposite sides of said valve chamber with said valve therebetween;
   valve seal means for sealing said valve in said valve body and for allowing said valve and valve seal means to be inserted into and removed from said valve body through said top opening as a unit, said valve means comprising a single seat ring and a seat ring assembly;
   said low pressure side seat receiving surface having only said single seat ring between said valve and said low pressure side seat receiving surface;
   said high pressure side seat receiving surface having said seat ring assembly between said valve and said high pressure side seat receiving surface; and
   said seat ring assembly including an annular seat ring, an annular seat ring holder and an annular belleville spring between said annular seat ring and said annular seat ring holder, said annular seat ring holder having annular groove means extending around the outer periphery thereof;
   whereby an improved seal is provided between said valve and said annular seat rings due to pressure from said annular belleville spring of said seat ring assembly and said valve body can be made without intricate machining of the valve body to hold said seat ring assembly in a nonexpanded condition for removal of said valve.

2. The top entry ball valve of claim 1, further comprising a semicircular arc shaped stepped portion of said valve body extending perpendicularly from a lower half of said low pressure side seat receiving surface and supporting the radially outer surface of said seat ring and a semicircular arc shaped stepped portion of said valve body extending perpendicularly from a lower half of said high pressure side seat receiving surface and supporting the radially outer surface of said seat ring assembly.

3. The top entry ball valve of claim 2, further comprising a bonnet removably fitted to said valve body for sealing said top opening and an operating portion extending through said bonnet and connected to said valve for rotating said valve.

4. The top entry ball valve of claim 2, wherein upper end faces of said stepped portions are disposed below a horizontal plane passing through a central axis of said valve.

5. The top entry ball valve of claim 1, further comprising a bonnet removably fitted to said valve body for sealing said top opening and an operating portion extending through said bonnet and connected to said valve for rotating said valve.

* * * * *